US012633634B2

(12) United States Patent
Howard

(10) Patent No.: US 12,633,634 B2
(45) Date of Patent: May 19, 2026

(54) NEGATIVE DIFFERENTIAL PHASE SHIFTER

(71) Applicant: John Howard, Upper Mount Bethel, PA (US)

(72) Inventor: John Howard, Upper Mount Bethel, PA (US)

(73) Assignee: John Howard, Upper Mount Bethel, PA (US)

( * ) Notice: Subject to any disclaimer, the term of this patent is extended or adjusted under 35 U.S.C. 154(b) by 230 days.

(21) Appl. No.: 18/215,024

(22) Filed: Jun. 27, 2023

(65) Prior Publication Data

US 2024/0030573 A1 Jan. 25, 2024

Related U.S. Application Data

(60) Provisional application No. 63/390,621, filed on Jul. 19, 2022.

(51) Int. Cl.
*H01P 1/18* (2006.01)
*H01P 11/00* (2006.01)

(52) U.S. Cl.
CPC ............ *H01P 1/184* (2013.01); *H01P 11/007* (2013.01)

(58) Field of Classification Search
CPC ............................... H01P 1/184; H01P 11/007
See application file for complete search history.

(56) References Cited

U.S. PATENT DOCUMENTS 3,761,843 A * 9/1973 Cappucci ................ H01P 5/184 333/112
6,320,481 B1 * 11/2001 Sharma ..................... H01P 1/18 333/159

OTHER PUBLICATIONS

B. M. Schiffman, "A New Class of Broad-Band Microwave 90-Degree Phase Shifters", IRE Transaction on Microwave Theory and Techniques, Mar. 4, 1957, pp. 232-237.

* cited by examiner

*Primary Examiner* — Andrea Lindgren Baltzell
*Assistant Examiner* — Kimberly E Glenn
(74) *Attorney, Agent, or Firm* — FisherBroyles, LLP

(57) ABSTRACT

A negative differential phase shifter includes a first uncoupled transmission line, wherein the first uncoupled transmission line has a length of λ/2 at a center frequency; a first coupled transmission line, wherein the first coupled transmission line is operatively connected to the first uncoupled transmission line; and a second uncoupled transmission line, wherein the second uncoupled transmission line is operatively connected to the first coupled transmission line, and the second uncoupled transmission line is operatively connected to the first uncoupled transmission line. A method of implementing a negative differential phase shifter includes operatively connecting a first coupled transmission line to a first uncoupled transmission line, wherein the first uncoupled transmission line has a length of λ/2 at a center frequency; operatively connecting a second uncoupled transmission line to the first coupled transmission line; and operatively connecting the second uncoupled transmission line to the first uncoupled transmission line.

16 Claims, 7 Drawing Sheets

NEGATIVE DIFFERENTIAL PHASE SHIFTER

CROSS-REFERENCE TO RELATED APPLICATION

This application claims the benefit of and priority to U.S. Provisional Application No. 63/390,621, filed Jul. 19, 2022, the disclosure of which is incorporated herein by reference in its entirety.

BACKGROUND

Field

The disclosed subject matter generally relates to microwave phase shifters and, more particularly, relates to negative differential phase shifters.

Related Art

Microwave phase shifters include devices that alter a phase of electromagnetic oscillations at an output of a transmission line with respect to a phase of electromagnetic oscillations at an input of the transmission line.

SUMMARY

Various embodiments of the subject matter disclosed herein relate to a negative differential phase shifter, which includes a first uncoupled transmission line, wherein the first uncoupled transmission line has a length of $\lambda/2$ at a center frequency; a first coupled transmission line, wherein the first coupled transmission line is operatively connected to the first uncoupled transmission line; and a second uncoupled transmission line, wherein the second uncoupled transmission line is operatively connected to the first coupled transmission line, and the second uncoupled transmission line is operatively connected to the first uncoupled transmission line.

The negative differential phase shifter may provide a negative phase shift of at least one of less than negative 90 degrees, equal to negative 90 degrees, and/or greater than negative 90 degrees. The negative differential phase shifter may include N first uncoupled transmission lines, wherein N represents an odd integer. The first coupled transmission line may be physically disconnected from the first uncoupled transmission line, the second uncoupled transmission line may be physically disconnected from the first coupled transmission line, and the second uncoupled transmission line may be physically disconnected from the first uncoupled transmission line. The negative differential phase shifter may include at least one second coupled transmission line operatively connected to at least one of the first uncoupled transmission line, second uncoupled transmission line, and/or first coupled transmission line. The negative differential phase shifter may include at least one third uncoupled transmission line operatively connected to at least one of the first uncoupled transmission line, second uncoupled transmission line, and/or first coupled transmission line.

Embodiments of the subject matter disclosed herein further relate to a method of implementing a negative differential phase shifter, which includes operatively connecting a first coupled transmission line to a first uncoupled transmission line, wherein the first uncoupled transmission line has a length of $\lambda/2$ at a center frequency; operatively connecting a second uncoupled transmission line to the first coupled transmission line; and operatively connecting the second uncoupled transmission line to the first uncoupled transmission line.

The negative differential phase shifter may provide a negative phase shift of at least one of less than negative 90 degrees, equal to negative 90 degrees, and/or greater than negative 90 degrees. The first uncoupled transmission line may include N first uncoupled transmission lines, wherein N represents an odd integer. The first coupled transmission line may be physically disconnected from the first uncoupled transmission line, the second uncoupled transmission line may be physically disconnected from the first coupled transmission line, and the second uncoupled transmission line may be physically disconnected from the first uncoupled transmission line. The method may include operatively connecting at least one second coupled transmission line to at least one of the first uncoupled transmission line, second uncoupled transmission line, and/or first coupled transmission line. The method may include operatively connecting at least one third uncoupled transmission line to at least one of the first uncoupled transmission line, second uncoupled transmission line, and/or first coupled transmission line.

Additional embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals, when used, indicate corresponding elements throughout the several views, and wherein.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

The phase of a transmission line may be shifted by increasing the length of the transmission line or by modifying the wavelength of a signal, such as but not limited to a microwave signal or a radio frequency (RF) signal, transmitted on the transmission line.

In microwave applications, phase shifters are passive devices that change the phase angle of a signal. Waves can combine to strengthen or weaken the signal, which depends on whether or not the waves to be combined are identical or different in phase and frequency. Waves to be combined with identical phases strengthen a signal, whereas opposing phases weaken the signal. Phase shifters may be used to change the phase angle of the signal so that the signal does not interfere with one or more additional signals. This technology maintains a desirable performance level by providing low insertion loss.

Such concepts are further clarified by considering noise-cancelling headphones, which also use phase shifting principles. In an audio application, rather than adjusting RF and microwave energy, the phase shift involves the phase of an audio wave in relation to another audio wave. Noise-canceling headphones reduce noise by inserting an audio wave that is 180 degrees out of phase with the noise surrounding the noise-cancelling headphones. The sound wave is shifted to cancel the noise wave, thus attenuating the noise that is heard.

The noise-cancelling example above illustrates an extreme result that is not typically prevalent in microwave applications. Generally, microwave phase shifters modify the wavelength of the signal to be phase shifted in minor increments to achieve a desired performance result. Phase shifters can be used in a variety of applications including phase modulators, frequency up-converters, testing instruments, and phased array antennas.

Broad-band differential phase shifters that provide a positive phase shift value are described in B. M. Schiffman, *A New Class of Broad-Band Microwave 90-Degree Phase Shifters*, IRE Transactions on Microwave Theory and Techniques, 4 Nov. 1957. In these positive phase shifters, an input of the phase shifter is divided equally between two output channels that provide a nearly constant positive phase difference, such as 90 degrees, between the output channels.

Figure 1:
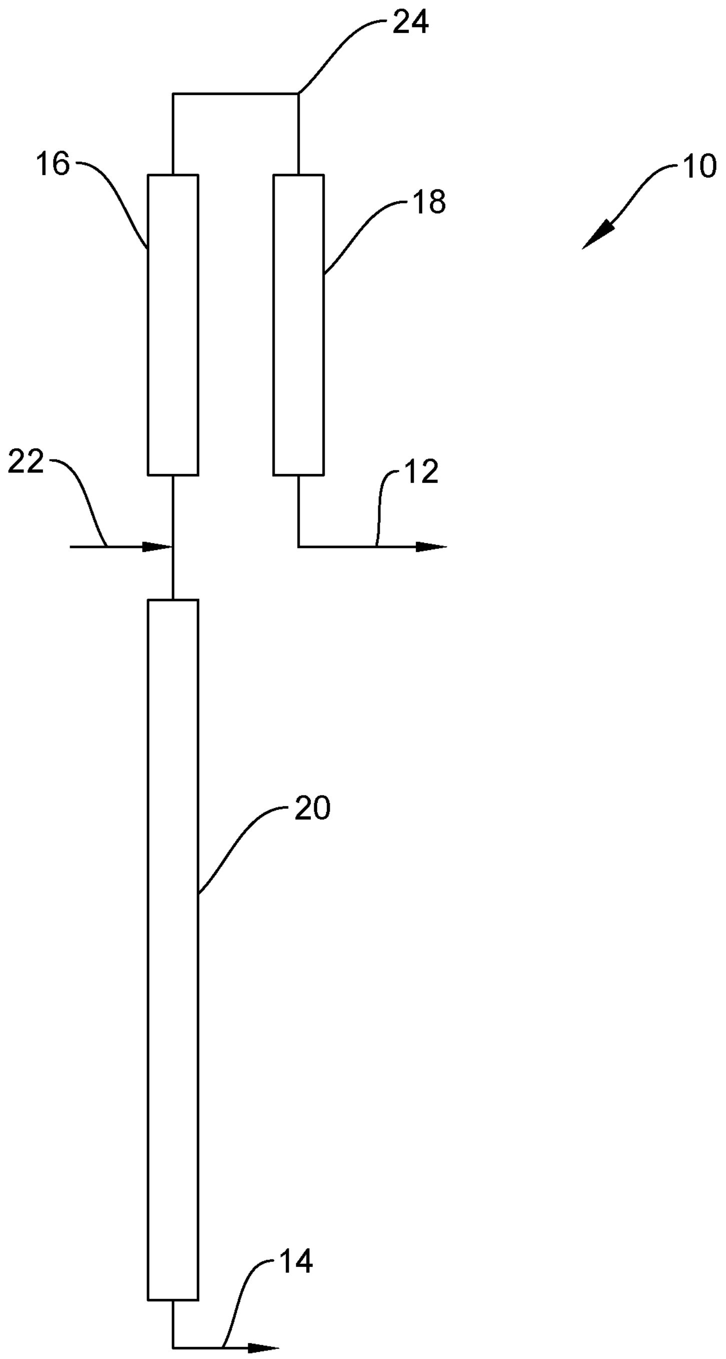
FIG. 1 shows is a schematic diagram of a first embodiment of a positive differential phase shifter.

An example of a positive phase shifter structure 10 is illustrated in FIG. 1. The phase shifter 10 includes a first output channel 12 operatively connected to a shorted coupled structure, which includes transmission lines 16, 18. The phase shifter also includes a second output channel 14 that is operatively connected to an uncoupled transmission line 20. An opposing end of the uncoupled transmission line 20 is operatively connected to an input channel 22. Coupled lines occur when two transmission lines 16, 18 are close enough in proximity so that energy from one transmission line 16 passes to the other transmission line 18 without requiring that the transmission lines 16, 18 be in contact with each other. The difference in phase between the first and second output channels 12, 14 is positive with the first output channel 12 leading the second output channel 14 in phase. Thus, the phase shifter 10 is referred to as a positive differential phase shifter.

One problem with the positive differential phase shifter 10 shown in FIG. 1 is that the shorted coupled structure leads in phase. Thus, if a positive differential phase shifter having a differential phase angle value greater than 90 degrees is desired, a coupling coefficient associated with the first channel output 12 becomes excessively large, thereby forcing a gap between the coupled transmission lines 16, 18 to be excessively small. In order to implement such a positive phase shifter, a substantial quantity of positive phase shifters, each of which provides a phase shift of less than or equal to 90 degrees and a large gap between the coupled transmission lines, are connected in series. However, this solution results in a positive phase shifter with a substantially greater size, weight, and insertion loss, thereby rendering such a positive differential phase shifter impractical to implement.

Figure 2A:
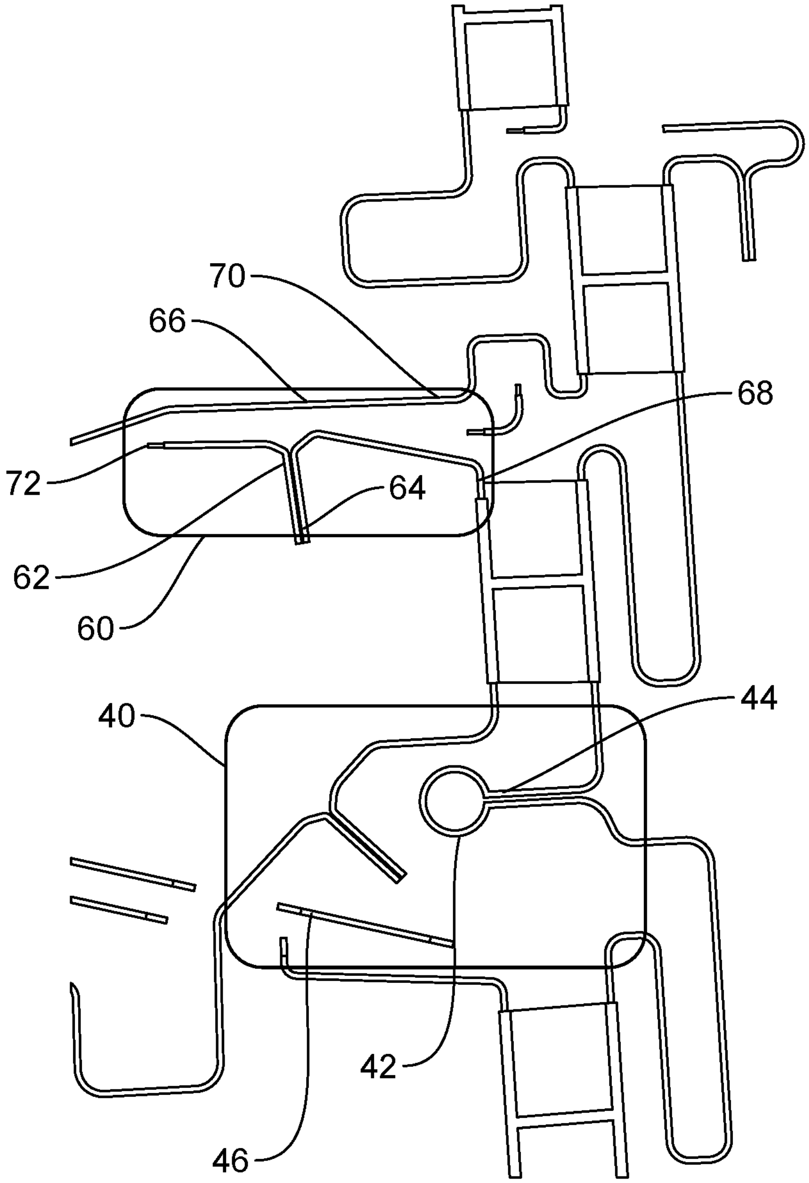
FIGS. 2A-B show a second embodiment of the positive differential phase shifter and a embodiments of a negative differential phase shifter.
Figure 2B:
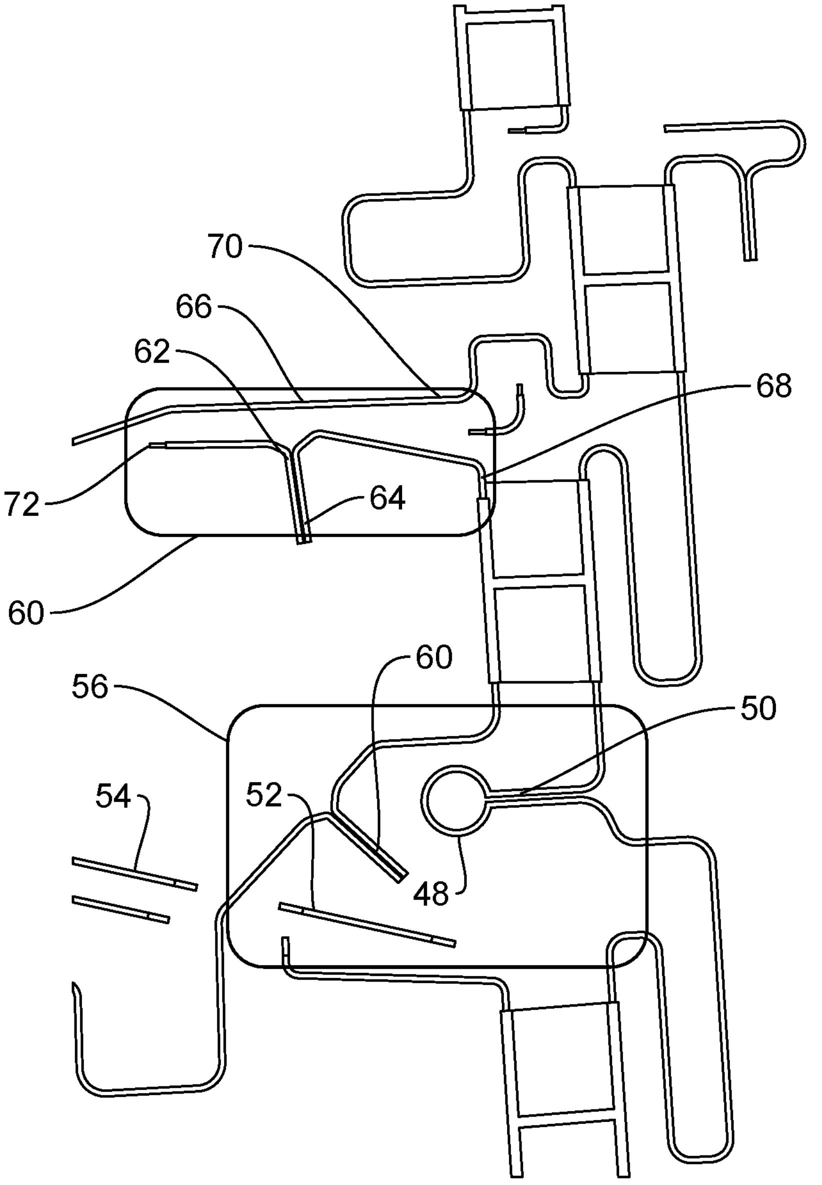

FIG. 2A-B show negative differential phase shifters 40, 56 in accordance with one or more embodiments disclosed herein. In FIG. 2A, the negative differential phase shifter 40 includes a λ/2 uncoupled transmission line 42 and a coupled transmission line 44. The negative differential phase shifter 40 also includes an uncoupled transmission line 46, which includes an input and an output. The input and output of the uncoupled transmission line 46 are arbitrary. That is, the input of the uncoupled transmission line 46 could be at a right end of the uncoupled transmission line 46, and the output of the uncoupled transmission line 46 could be at a left end of the uncoupled transmission line 46 when the system is transmitting. Similarly, the input of the uncoupled transmission line 46 could be at the left end of the uncoupled transmission line 46 and the output of the uncoupled transmission line 46 could be at the right end of the uncoupled transmission line 46 when the system is receiving. This feature remains true if the direction of energy of the input and output is the same for the uncoupled transmission line 42, coupled transmission line 44, and uncoupled transmission line 46.

The coupled transmission line 44 is operatively connected to the λ/2 uncoupled transmission line 42, but may be physically disconnected from the λ/2 uncoupled transmission line 42, as shown in FIG. 2B by the λ/2 uncoupled transmission line 48 and the coupled transmission line 50. The uncoupled transmission line 46 is operatively connected to the coupled transmission line 44, but may be physically disconnected from the coupled transmission line 44. The uncoupled transmission line 46 is operatively connected to the λ/2 uncoupled transmission line 42, but may be physically disconnected from the λ/2 uncoupled transmission line 42. FIG. 2B also shows an additional uncoupled transmission line 54 and an additional coupled transmission line 60 as portions of the negative differential phase shifter 56.

By incorporating the λ/2 uncoupled transmission line 42 with the coupled transmission line 44, as a substitute for the shorted coupled structure 16, 18 shown in FIG. 1, and modifying a length of the uncoupled transmission line 46, the coupling coefficient of the resulting negative differential phase shifter 40 is substantially reduced. In FIG. 1, the length of a transmission line 24 is zero, and thus a positive differential phase shifter is implemented. In contrast, if the length of the transmission line 24 is λ/2 (i.e., 180 degrees) a negative differential phase shifter is implemented.

The length of the uncoupled transmission line 46 depends on the desired difference in phase angle value between the uncoupled transmission line 46 and a combination of the λ/2 uncoupled transmission line 42 and the coupled transmission line 44. For example, to implement a phase angle difference of +90 degrees using the negative differential phase shifter 40, the uncoupled transmission line 46 would be made λ/4 longer at a center frequency than the uncoupled output channel 42, 44 (i.e., the combination of the λ/2 uncoupled transmission line 42 and the coupled transmission line 44). Similarly, to implement a phase angle difference of −90 degrees, the uncoupled transmission line 46 would be made λ/4 shorter at a center frequency than the uncoupled output channel 42, 44 (i.e., the combination of the λ/2 uncoupled transmission line 42 and the coupled transmission line 44).

To obtain alternative phase angle differences using the negative differential phase shifter, the coupling coefficient of the coupled transmission line 44 may be modified, and the length of the uncoupled transmission line 46, which is shown as being longer than the length of the coupled transmission line 44, may be modified in so that a desired phase angle difference is provided at the center frequency. For example, if the uncoupled transmission line 46 is 3λ/4 long, a phase shift or phase angle difference of −90 degrees results. Similarly, if the uncoupled transmission line 46 is 2.5λ/4 long, then a phase angle difference of −135 degrees results. Likewise, if the uncoupled transmission line 46 is 3.5λ/4, then a phase angle difference of −45 degrees results. Accordingly, in these examples, as the length of the uncoupled transmission line 46 is increased by λ/8 (i.e., 45 degrees), the phase angle difference decreases by the same amount (i.e., 45 degrees).

The uncoupled transmission line 46 of the negative differential phase shifter 40, may be replaced or supplemented with another coupled transmission line 60 having a zero length short 24, thereby providing a positive phase angle difference. The uncoupled transmission line 46 of the negative differential phase shifter 40, may be replaced or supplemented with another λ/2 uncoupled transmission line 42, 60, thereby providing a negative phase angle difference. These embodiments enable substantial improvements in bandwidth and manufacturability of the resulting differential phase shifter.

As a result, differential phase shifters exhibiting less than, equal to, or greater than a 90-degree phase shift may be advantageously implemented using one or more embodiments of the negative differential phase shifter disclosed herein. Differential phase shifts implemented using the negative differential phase shifter are referred to as being negative since the combination of the coupled transmission line 44 and the λ/2 uncoupled transmission line 42 output channel lags in phase behind the uncoupled transmission line 46 output channel.

FIGS. 2A-B also illustrate a positive differential phase shifter 60 that may be used to provide phase shifts of less than or equal to 90 degrees. The positive differential phase shifter 60 includes a first channel output 68 connected to a shorted coupled structure, which includes transmission lines 62, 64, and a second channel output 70, which is connected to an uncoupled transmission line 66. An opposing end of the uncoupled transmission line 66 is operatively connected to an input channel 72. The shorted coupled structure 62, 64 and the uncoupled transmission line 66 are separate and not connected. The difference in phase between the first and second channel outputs 68, 70 is positive with the first channel output 68 leading in phase. Thus, the phase shifter 60 is referred to as a positive differential phase shifter.

In contrast, the negative phase shifter 40 may advantageously be used to provide phase shifts of less than, equal to, or greater than 90 degrees. The λ/2 uncoupled transmission line 42 can assume any shape, as long as spurious reactance is not introduced. For example, a non-smooth λ/2 uncoupled transmission lines 42 may introduce spurious reactance, which may be addressed by modifying a length of the λ/2 uncoupled transmission line 42. In addition, N λ/2 uncoupled transmission line lengths may be added to the coupled transmission line 44, wherein N represents an odd integer.

Figure 3:
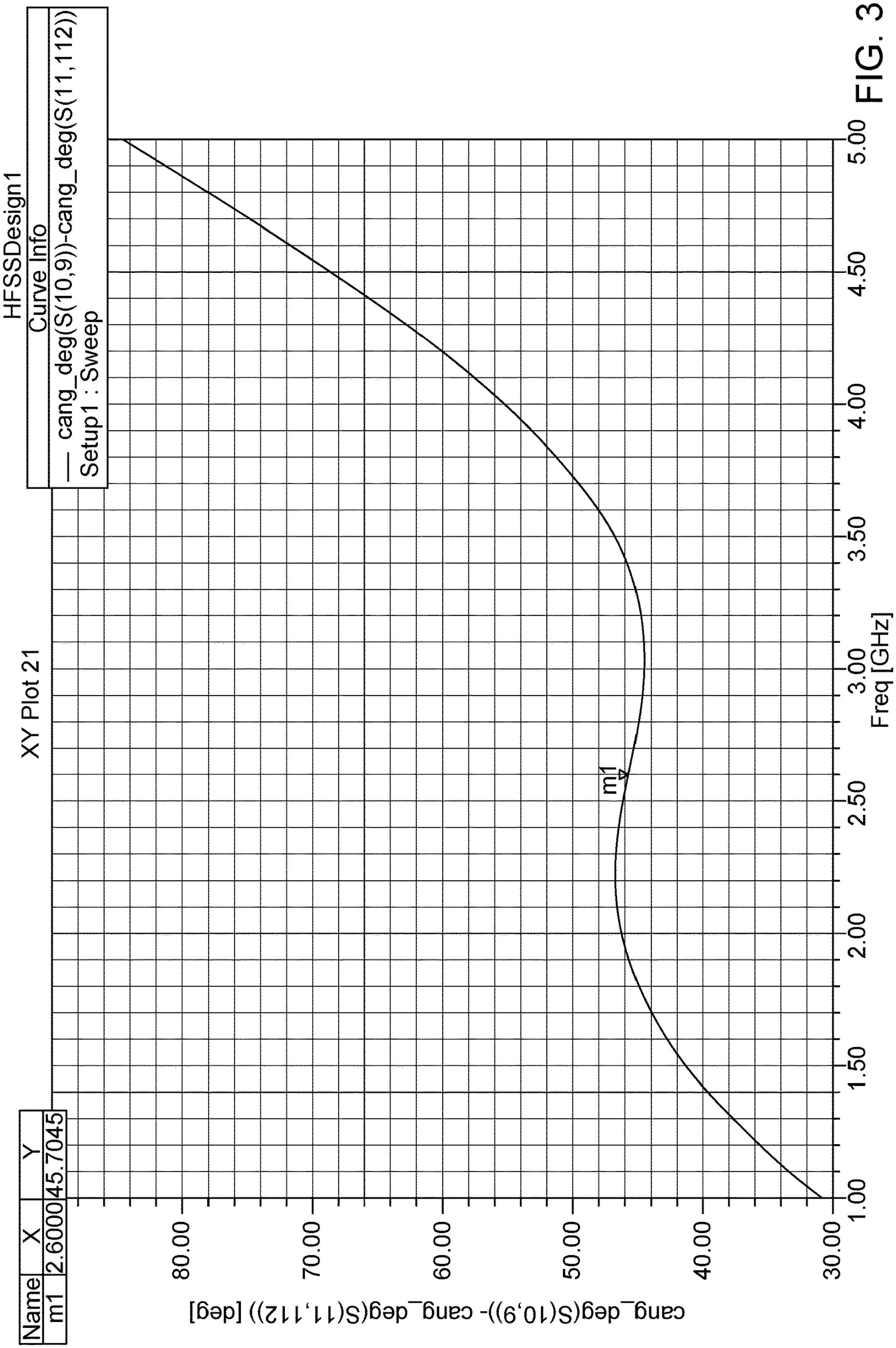
FIG. 3 shows a graph of phase shift as a function of frequency for a positive phase shifter.
Figure 4:
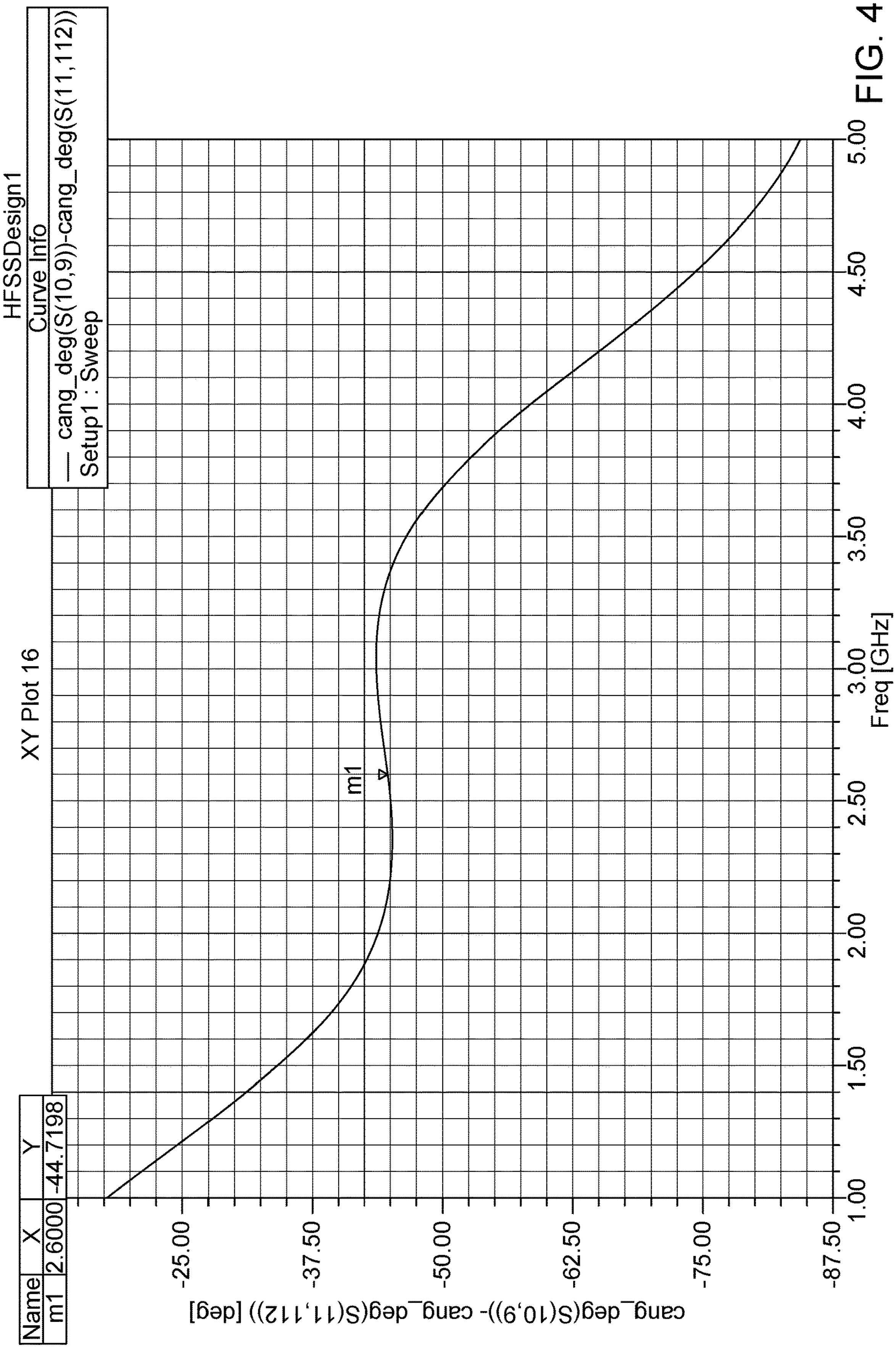
FIG. 4 shows a graph of phase shift as a function of frequency for a negative phase shifter.

FIG. 3 shows a graph of phase shift as a function of frequency for a positive 45-degree phase shifter. FIG. 4 shows a graph of phase shift as a function of frequency for a negative 45-degree phase shifter. The two graphs show the same bandwidth with, however, a substantially different coupled line gap requirement. Specifically, the gap between the coupled lines corresponding to the positive 45-degree phase shifter is 8 mils, whereas the gap between the coupled lines corresponding to the negative 45-degree phase shifter is 28 mils. Accordingly, since the 28 mil gap associated with the negative 45-degree phase shifter is substantially easier to manufacture than the 8 mil gap associated with the positive 45-degree phase shifter, the negative 45-degree phase shifter is also substantially easier, and thus less costly, to manufacture. Typically, 5 mils represents the minimum gap that is conventionally achievable, although 2-3 mil gaps have been achieved at significantly greater cost and delay. As the phase shift increases beyond 90 degrees, construction of the coupled line section of the positive phase shifter becomes impossible due to the increasingly smaller gap required between the coupled lines.

A mathematical derivation (see B. M. Schiffman, *A New Class of Broad-Band Microwave 90-Degree Phase Shifters*, IRE Transactions on Microwave Theory and Techniques, 4 Nov. 1957) for embodiments of the negative differential phase shifter disclosed herein follows. Using comparable relevant variables for the negative phase shifter results in equation (1) below for π, which is maintained at all frequencies using active or coupled passive techniques and is highly beneficial in applications including wideband defense.

$$\Delta\Phi = A\Theta - (\arccos((\rho - \tan^2(\Theta))/(\rho + \tan^2(\Theta))) - \pi) \quad (1)$$

Figure 5:
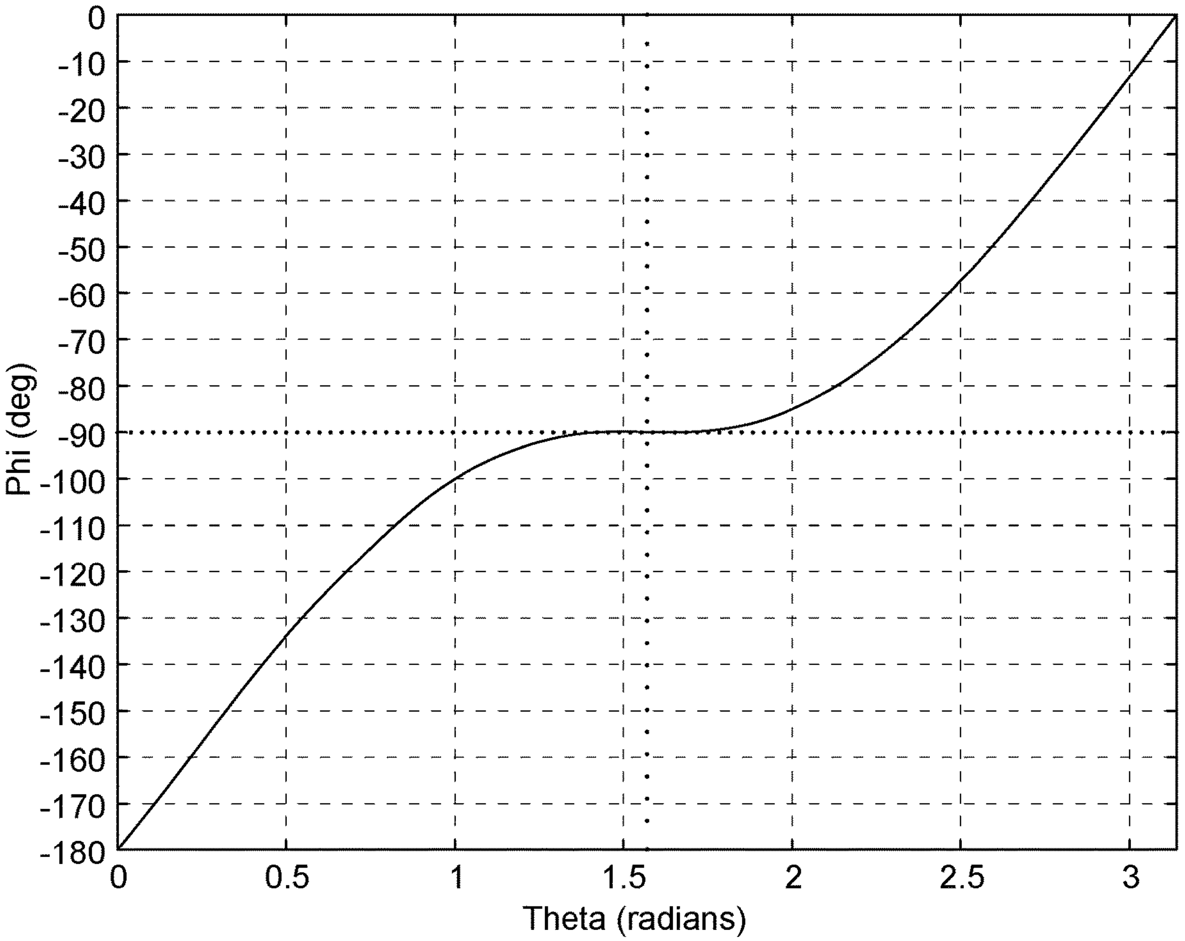
FIG. 5 shows a graph of image impedance as a function of phase shift and frequency variable for a negative 45-degree phase shifter.
Figure 6:
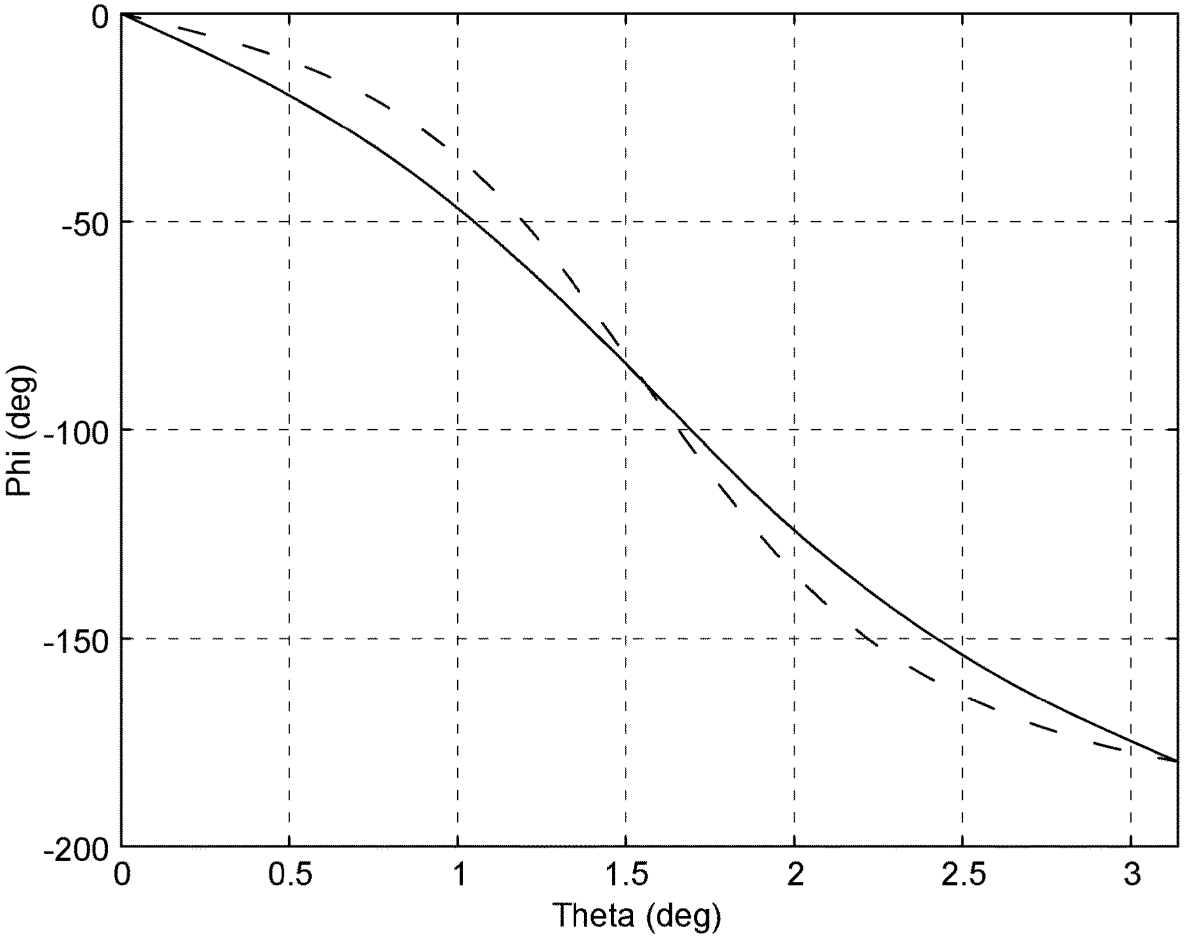
FIG. 6 shows a graph of phase shift as a function of frequency for a negative phase shifter for two different values of $\rho$.

ΔΦ represents a phase shift in degrees, Θ represents a frequency variable in radians, ρ is equal to $Z_{0e}/Z_{0o}$, $Z_{0e}$ represents a characteristic impedance of one line to ground when equal in-phase currents flow in both lines, and $Z_{0o}$ represents a characteristic impedance of one line to ground when equal out-of-phase currents flow in both lines. Thus, for example, if ΔΦ=−90 degrees, A=3. FIG. 5 shows a graph of image impedance $Z_I$, which is equal to $\sqrt{Z_{0e}Z_{0o}}$, as a function of the phase shift Φ and the frequency variable Θ. If π is maintained at the center frequency and allowed to vary across the band, depending on μ in the equation (1) above, a 10%-20% bandwidth is achieved that is suitable for wireless communications, as shown in FIG. 6 for two different values of ρ.

The illustrations of embodiments described herein are intended to provide a general understanding of the structure of various embodiments, and the embodiments are not intended to serve as a complete description of all the elements and features of apparatus and systems that might make use of the structures described herein. Many other embodiments will be apparent to those skilled in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those skilled in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. A negative differential phase shifter, which comprises:

a first uncoupled transmission line, the first uncoupled transmission line comprising a length of λ/2 at a center frequency;

a first coupled transmission line, the first coupled transmission line operatively connected to the first uncoupled transmission line; and a second uncoupled transmission line, the second uncoupled transmission line operatively connected to the first coupled transmission line, the second uncoupled transmission line operatively connected to the first uncoupled transmission line, wherein the negative differential phase shifter provides a negative phase shift of at least one of less than negative 90 degrees, equal to negative 90 degrees, greater than negative 90 degrees.

2. The negative differential phase shifter, as defined by claim 1, wherein the negative differential phase shifter comprises N first uncoupled transmission line lengths, N representing an odd integer.

3. The negative differential phase shifter, as defined by claim 1, wherein the first coupled transmission line is physically disconnected from the first uncoupled transmission line.

4. The negative differential phase shifter, as defined by claim 1, wherein the second uncoupled transmission line is physically disconnected from the first coupled transmission line.

5. The negative differential phase shifter, as defined by claim 1, wherein the second uncoupled transmission line is physically disconnected from the first uncoupled transmission line.

6. The negative differential phase shifter, as defined by claim 1, further comprising at least one second coupled transmission line, the at least one second coupled transmission line operatively connected to at least one of the first uncoupled transmission line, second uncoupled transmission line, first coupled transmission line.

7. The negative differential phase shifter, as defined by claim 1, further comprising at least one third uncoupled transmission line, the at least one third uncoupled transmission line operatively connected to at least one of the first uncoupled transmission line, second uncoupled transmission line, first coupled transmission line.

8. The negative differential phase shifter, as defined by claim 1, wherein the first uncoupled transmission line comprises a short of length λ/2 at a center frequency.

9. A method of implementing a negative differential phase shifter, which comprises:

operatively connecting a first coupled transmission line to a first uncoupled transmission line, the first uncoupled transmission line comprising a length of λ/2 at a center frequency;

operatively connecting a second uncoupled transmission line to the first coupled transmission line; and operatively connecting the second uncoupled transmission line to the first uncoupled transmission line, wherein the negative differential phase shifter provides a negative phase shift of at least one of less than negative 90 degrees, equal to negative 90 degrees, greater than negative 90 degrees.

10. The method, as defined by claim 9, wherein the first uncoupled transmission line comprises N first uncoupled transmission line lengths, N representing an odd integer.

11. The method, as defined by claim 9, wherein the first coupled transmission line is physically disconnected from the first uncoupled transmission line.

12. The method, as defined by claim 9, wherein the second uncoupled transmission line is physically disconnected from the first coupled transmission line.

13. The method, as defined by claim 9, wherein the second uncoupled transmission line is physically disconnected from the first uncoupled transmission line.

14. The method, as defined by claim 9, further comprising operatively connecting at least one second coupled transmission line to at least one of the first uncoupled transmission line, second uncoupled transmission line, first coupled transmission line.

15. The method, as defined by claim 9, further comprising operatively connecting at least one third uncoupled transmission line to at least one of the first uncoupled transmission line, second uncoupled transmission line, first coupled transmission line.

16. The method, as defined by claim 9, wherein the first uncoupled transmission line comprises a short of length $\lambda/2$ at a center frequency.

* * * * *